(12) United States Patent
Tanaka et al.

(10) Patent No.: US 9,656,684 B2
(45) Date of Patent: May 23, 2017

(54) STEERING DEVICE

(71) Applicants: JTEKT CORPORATION, Osaka-shi, Osaka (JP); TOYOTA JIDOSHA KABUSHIKI KAISHA, Toyota-shi, Aichi (JP)

(72) Inventors: Eiji Tanaka, Kitakatsuragi-gun (JP); Fumio Kishida, Toyota (JP); Susumu Imagaki, Tondabayashi (JP); Hiroshi Kawakami, Toyota (JP)

(73) Assignees: JTEKT CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/895,677

(22) PCT Filed: Jun. 25, 2014

(86) PCT No.: PCT/JP2014/066769
§ 371 (c)(1),
(2) Date: Dec. 3, 2015

(87) PCT Pub. No.: WO2014/208573
PCT Pub. Date: Dec. 31, 2014

(65) Prior Publication Data
US 2016/0114828 A1 Apr. 28, 2016

(30) Foreign Application Priority Data

Jun. 28, 2013 (JP) ................. 2013-136778

(51) Int. Cl.
*B62D 1/19* (2006.01)
(52) U.S. Cl.
CPC .................. *B62D 1/195* (2013.01)

(58) Field of Classification Search
CPC ...................................... B62D 1/195
See application file for complete search history.

(56) References Cited

U.S. PATENT DOCUMENTS

| 3,945,662 A | * | 3/1976 | Murase | ..................... B62D 1/11 |
| | | | | 280/777 |
| 6,367,840 B1 | * | 4/2002 | Duval | .................... B62D 1/195 |
| | | | | 280/777 |

(Continued)

FOREIGN PATENT DOCUMENTS

| CN | 101372238 A | 2/2009 |
| CN | 201923199 U | 8/2011 |

(Continued)

OTHER PUBLICATIONS

Jul. 29, 2014 International Search Report issued in International Patent Application No. PCT/JP2014/066769.

(Continued)

*Primary Examiner* — Darlene P Condra
(74) *Attorney, Agent, or Firm* — Oliff PLC

(57) ABSTRACT

Elongated holes are formed in a first plate of a fixed bracket so as to extend parallel to a column moving direction. An elongated hole inserted portion of a suspending bolt of a suspending mechanism is disposed in an initial assembling position in one of the elongated holes. An inner circumference of the elongated hole includes a pair of flat surface portions which are parallel to the column moving direction, an arc-shaped surface portion and tapered surface portions which connect a pair of end portions of the arc-shaped surface portion to the corresponding flat surface portion. Tapered angles which the tapered surfaces form relative to the column moving direction are equal to or greater than a friction angle.

8 Claims, 11 Drawing Sheets

(56) References Cited

U.S. PATENT DOCUMENTS

| | | | |
|---|---|---|---|
| 2007/0068311 A1* | 3/2007 | Shimoda | B62D 1/195 74/493 |
| 2008/0012281 A1 | 1/2008 | Cho et al. | |
| 2012/0112443 A1 | 5/2012 | Arakawa et al. | |
| 2012/0169035 A1 | 7/2012 | Minamigata et al. | |
| 2012/0267884 A1 | 10/2012 | Fujiwara et al. | |
| 2012/0319388 A1 | 12/2012 | Ishii et al. | |
| 2013/0133460 A1 | 5/2013 | Uesaka | |
| 2014/0197293 A1 | 7/2014 | Fujiwara et al. | |
| 2015/0314802 A1 | 11/2015 | Tanaka et al. | |
| 2015/0360714 A1 | 12/2015 | Tanaka et al. | |
| 2016/0167694 A1* | 6/2016 | Hagiwara | B62D 1/184 74/493 |

FOREIGN PATENT DOCUMENTS

| | | |
|---|---|---|
| CN | 103171610 A | 6/2013 |
| EP | 3 009 327 A1 | 4/2016 |
| JP | H10-264860 A | 10/1998 |
| JP | 2004-291691 A | 10/2004 |
| JP | 2012-106686 A | 6/2012 |
| JP | 2012-148758 A | 8/2012 |
| JP | 2013-047088 A | 3/2013 |
| JP | 2013-112147 A | 6/2013 |
| JP | 2014-144746 A | 8/2014 |
| JP | 2014-166841 A | 9/2014 |
| WO | 2011/158787 A1 | 12/2011 |
| WO | 2012/128171 A1 | 9/2012 |

OTHER PUBLICATIONS

Jan. 24, 2017 European Search Report issued in European Application No. 14817765.2.
Nov. 28, 2016 Office Action issued in Chinese Application No. 201480036334.2.

* cited by examiner

STEERING DEVICE

TECHNICAL FIELD

The present invention relates to a steering device.

BACKGROUND ART

In a steering device, following a primary collision in which a vehicle collides with another vehicle, a secondary collision occurs in which a driver of the vehicle collides with a steering wheel thereof. With a view to absorbing an impact associated with the secondary collision, various types of constructions have been proposed in which a portion of a steering column is dislocated from a body of a vehicle so as to be allowed to move in a column axial direction.

For example, in Patent Literature 1, a suspending bolt is inserted through an elongated through hole provided in a base plate portion of a body side bracket and is then inserted through a sliding blank plate having a pair of sliding plate portion which follow an upper and lower surfaces of the base plate portion. The base plate portion of the body side bracket is held via both the sliding plate portions between a fastening portion which is fixedly provided on the suspending bolt and an upper plate portion of a column side bracket, whereby the column side bracket is connected to the body side bracket so as to be supported thereon. When a secondary collision occurs, the sliding blank plate moves together with the suspending bolt in a column axial direction.

CITATION LIST

Patent Literature

[Patent Literature 1] JP-A-2012-148758

SUMMARY OF INVENTION

Technical Problem

When a secondary collision occurs, however, in the event of a load being inputted obliquely into a steering shaft, there are fears that the suspending bolt bites into an inner circumference of the elongated hole in such a way as to produce a dent thereon. In the case of the suspending bolt so biting into the elongated hole, a braking force is applied to the suspending bolt which is moving (being dislocated), resulting in fears that the dislocating load is increased.

Then, an object of the invention is to provide a steering device which can suppress the increase in dislocating load when a secondary collision occurs.

Solution to Problem

With a view to achieving the object, an invention provides a steering device comprising:
a fixed bracket which includes a first plate which is fixed to a vehicle body-side member;
a movable jacket which rotatably supports a steering shaft having a steering member connected to one end of the steering shaft;
a movable bracket which supports the movable jacket so as to move in a column moving direction when a secondary collision occurs and which includes a second plate facing the first plate; and
a pair of suspending mechanisms which include a pair of suspending shafts which are inserted through a pair of elongated holes and a pair of circular holes, the elongated holes being provided in the first plate so as to extend parallel to the column moving direction, and the circular holes being provided in the second plate so as to respectively correspond to the pair of elongated holes, to connect the first plate and the second plate together to thereby suspend the movable jacket via the movable bracket, wherein respective elongated hole inserted portions of the suspending shafts move from an initial assembling position in the column moving direction along the corresponding elongated holes when the secondary collision occurs, wherein an inner circumference of either of the elongated holes includes a pair of flat surface portions which extend parallel to the column moving direction and a space defined therebetween which is greater than an outside diameter of the elongated hole inserted portion of the corresponding suspending shaft, a concavely arc-shaped surface portion which bears part of an outer circumference of the elongated hole inserted portion of the corresponding suspending shaft which is disposed in the initial assembling position, and a pair of tapered surface portions which extend individually from a pair of end portions of the arc-shaped surface portion in a tangential direction to connect to the corresponding flat surface portions, and wherein tapered angles which the tapered surfaces form relative to the column moving direction are equal to or greater than a friction angle R.

The parenthesized alphanumeric characters denote corresponding constituent elements or the like in embodiments which will be described later, which does not, of course, mean that the invention is to be limited to those embodiments. The same applies below.

In addition, as claimed, the steering device may include a surface pressure concentration lessening member which surrounds the elongated hole inserted portion of the suspending shaft which is inserted through the one of the elongated holes to scatter a contact pressure against the inner circumferential surface of the one elongated hole.

Additionally, as claimed, the surface pressure concentration lessening member may include a rotary member which is fitted on the elongated hole inserted portion rotatably so as to be brought into rolling contact with the inner circumference of the one elongated hole.

Additionally, as claimed, the surface pressure concentration lessening member may include a sliding member which is fitted on the elongated hole inserted portion so as to be brought into sliding contact with the inner circumference of the one elongated hole.

Additionally, as claimed, the sliding member may include an arc-shaped surface portion which fits in the arc-shaped surface portion of the one elongated hole and a pair of flat surface portions which extend parallel to the column moving direction while facing the pair of flat surface portions of the one elongated hole, respectively.

Additionally, an invention provides a steering device comprising:
a fixed bracket which includes a first plate which is fixed to a vehicle body-side member;
a movable jacket which rotatably supports a steering shaft having a steering member connected to one end of the steering shaft and a movable bracket which supports the movable jacket so as to move in a column moving direction when a secondary collision occurs and which includes a second plate facing the first plate;
a pair of suspending mechanisms which include a pair of suspending shafts which are inserted through a pair of elongated holes and a pair of circular holes, the elongated holes being provided in the first plate so as to extend parallel to the column moving direction and the circular holes being provided in the second plate so as to respectively correspond to the pair of elongated holes, to connect the first plate and the second plate together to thereby suspend the movable jacket via the movable bracket, wherein respective elongated hole inserted portions of the suspending shafts move from an initial assembling position in the column moving direction along the corresponding elongated holes when the secondary collision occurs; and a surface pressure concentration lessening member which surrounds the elongated hole inserted portion of the suspending shaft which is inserted through at least one of the elongated holes to scatter a contact pressure against the inner circumference of the corresponding elongated hole.

Additionally, as claimed, the surface pressure concentration lessening member may include a rotary member which is fitted on the elongated hole inserted portion rotatably so as to be brought into rolling contact with the inner circumference of the corresponding elongated hole.

Additionally, as claimed, the surface pressure concentration lessening member may include a sliding member which is fitted on the elongated hole inserted portion so as to be brought into sliding contact with the inner circumference of the corresponding elongated hole.

Advantageous Effects of Invention

According to the invention, the tapered angles of the tapered surface portions of the elongated hole are equal to or greater than the friction angle. Therefore, when a secondary collision occurs, the elongated hole inserted portion of the suspending shaft can move (be dislocated) smoothly from the initial assembling position in the first direction without being caught. Consequently, it is possible to suppress the increase in the dislocating load.

According to the invention, the surface pressure concentration lessening member which surrounds the elongated hole inserted portion of the suspending shaft lessens the surface pressure concentration on the inner circumference of the elongated hole. Therefore, when a secondary collision occurs, the elongated hole inserted portion moves (is dislocated) smoothly without biting into the inner circumference of the elongated hole.

According to the invention, when a secondary collision occurs, the rotary member which is fitted on the elongated hole inserted portion rotatably rolls on the inner circumference of the elongated hole, whereby the concentration of surface pressure on the inner circumference of the elongated hole is lessened, thereby making it possible to allow the elongated hole inserted portion to be dislocated smoothly from the initial assembling position.

According to the invention, when a secondary collision occurs, the sliding member which is fitted on the elongated hole inserted portion rotatably slides on the inner circumference of the elongated hole, whereby the concentration of surface pressure on the inner circumference of the elongated hole is lessened, thereby making it possible to allow the elongated hole inserted portion to be dislocated smoothly from the initial assembling position.

According to the invention, the sliding member includes the pair of flat surface portions which extend parallel to the column moving direction while facing the pair of flat surface portions of the elongated hole, respectively. Therefore, the concentration of surface pressure is lessened in an ensured fashion, thereby making it possible to realize a smooth dislocation in an ensured fashion.

According to the invention, the surface pressure concentration lessening member which surrounds the elongated hole inserted portion of the suspending shaft lessens the concentration of surface pressure on the inner circumference of the elongated hole. Therefore, when a secondary collision occurs, the elongated hole inserted portion moves (is dislocated) smoothly from the initial assembling position without biting into the inner circumference of the elongated hole.

According to the invention, when a secondary collision occurs, the rotary member which is fitted on the elongated hole inserted portion rotatably rolls on the inner circumference of the elongated hole, whereby the concentration of surface pressure on the inner circumference of the elongated hole is lessened, thereby making it possible to allow the elongated hole inserted portion to be dislocated smoothly from the initial assembling position.

According to the invention, when a secondary collision occurs, the sliding member which is fitted on the elongated hole inserted portion rotatably slides on the inner circumference of the elongated hole, whereby the concentration of surface pressure on the inner circumference of the elongated hole is lessened, thereby making it possible to allow the elongated hole inserted portion to be dislocated smoothly from the initial assembling position.

DESCRIPTION OF EMBODIMENTS

Referring to the accompanying drawings, preferred embodiments of the invention will be described.

Figure 1:
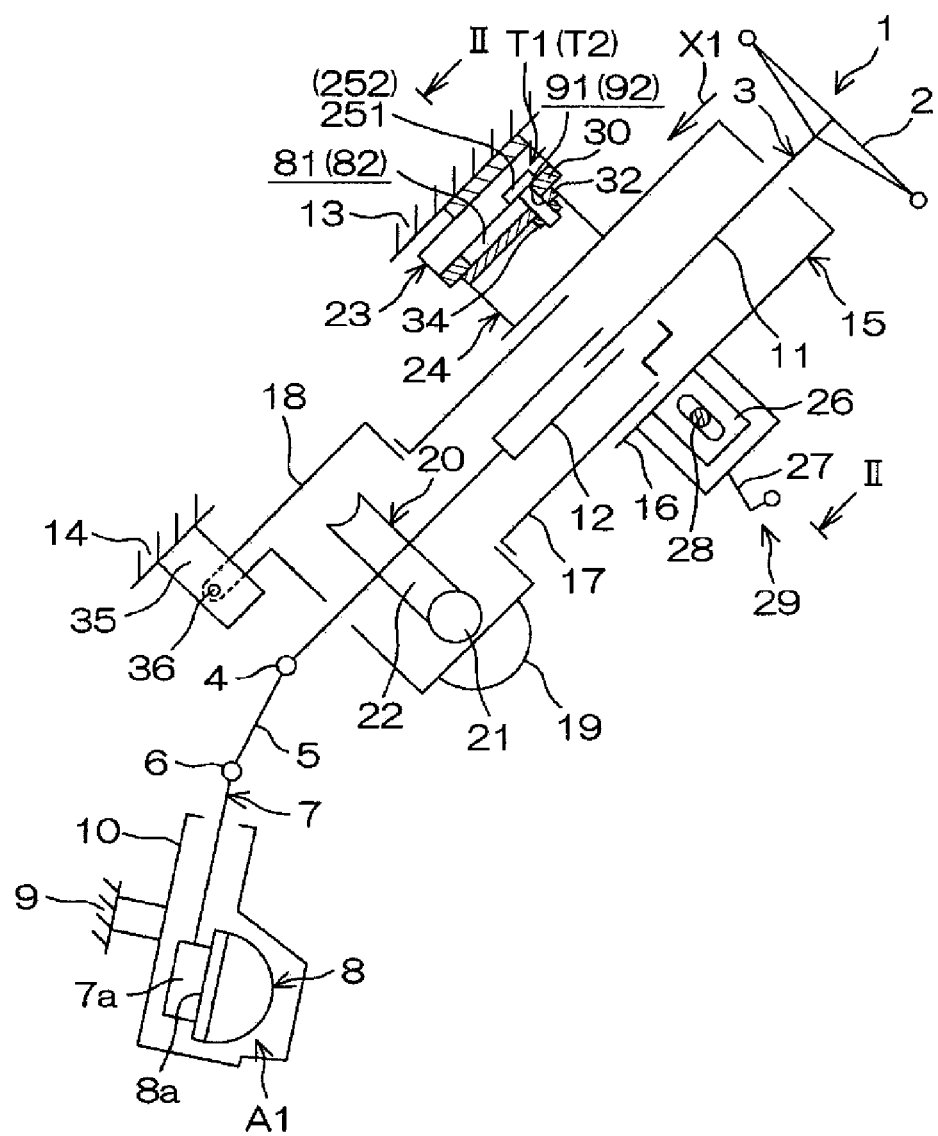
FIG. 1 is a schematic side view of a steering device of a first embodiment of the invention, which shows a schematic configuration of the steering device.

FIG. 1 is a schematic diagram showing a schematic configuration of a steering device of a first embodiment of the invention. Referring to FIG. 1, a steering device 1 has a steering shaft 3 which is connected to a steering member 2 such as a steering wheel, an intermediate shaft 5 which is connected to the steering shaft 3 via a universal joint 4, a pinion shaft 7 which is connected to the intermediate shaft 5 via a universal joint 6, and a rack shaft 8 which has a rack 8a configured to mesh with a pinion 7a which is provided near an end portion of the pinion shaft 7 so as to turn steered wheels.

A steering mechanism A1 is made up of a rack-and-pinion mechanism which includes the pinion shaft 7 and the rack shaft 8. The rack shaft 8 is supported by a housing 10 which is fixed to a vehicle body-side member 9 so as to move in an axial direction (a direction which is at right angles to a surface of a sheet of paper on which FIG. 1 is drawn) which follows a left-to-right direction of a vehicle. Although not shown, end portions of the rack shaft 8 are connected to corresponding steered wheels via corresponding tie-rods and corresponding knuckle arms.

The steering shaft 3 has an upper shaft 11 and a lower shaft 12 which are connected together through spline fitting, for example, so as not only to rotate together but also to move relatively in an axial direction. The steering shaft 3 is supported rotatably via bearings, not shown, by a steering column 15 which is fixed to vehicle body-side members 13, 14.

The steering column 15 includes a tubular upper jacket 16 (a movable jacket) and a tubular lower jacket 17 which are fitted together so as to move relatively in the axial direction, and a housing 18 which is connected to an axial lower end of the lower jacket 17. A speed reduction mechanism 20 is accommodated in the housing 18, and this speed reduction mechanism 20 decelerates the power of a steering assist electric motor 19 for transmission to the lower shaft 12. The speed reduction mechanism 20 has a drive gear 21 which is connected so as to rotate together with a rotational shaft (not shown) of the electric motor 19 and a driven gear 22 which meshes with the drive gear 21 and which rotates together with the lower shaft 12.

In addition to the steering shaft 3, the steering column 15 and others, the steering device 1 includes constituent components, which will be described later, including a fixed bracket 23, a tilt bracket 24, suspending mechanisms T1, T2, a lock mechanism 29, a connecting-disconnecting mechanism R1 and the like.

In this embodiment, the steering device 1 will be described as being applied to an electric power steering device. However, the invention may be applied to a manual steering device. Additionally, in this embodiment, the steering device 1 will be described as being tiltable. However, the invention may be applied to a steering device which has no tilt adjusting function or may be applied to a steering device which enables both a tilting adjustment and a telescoping adjustment.

Figure 2:
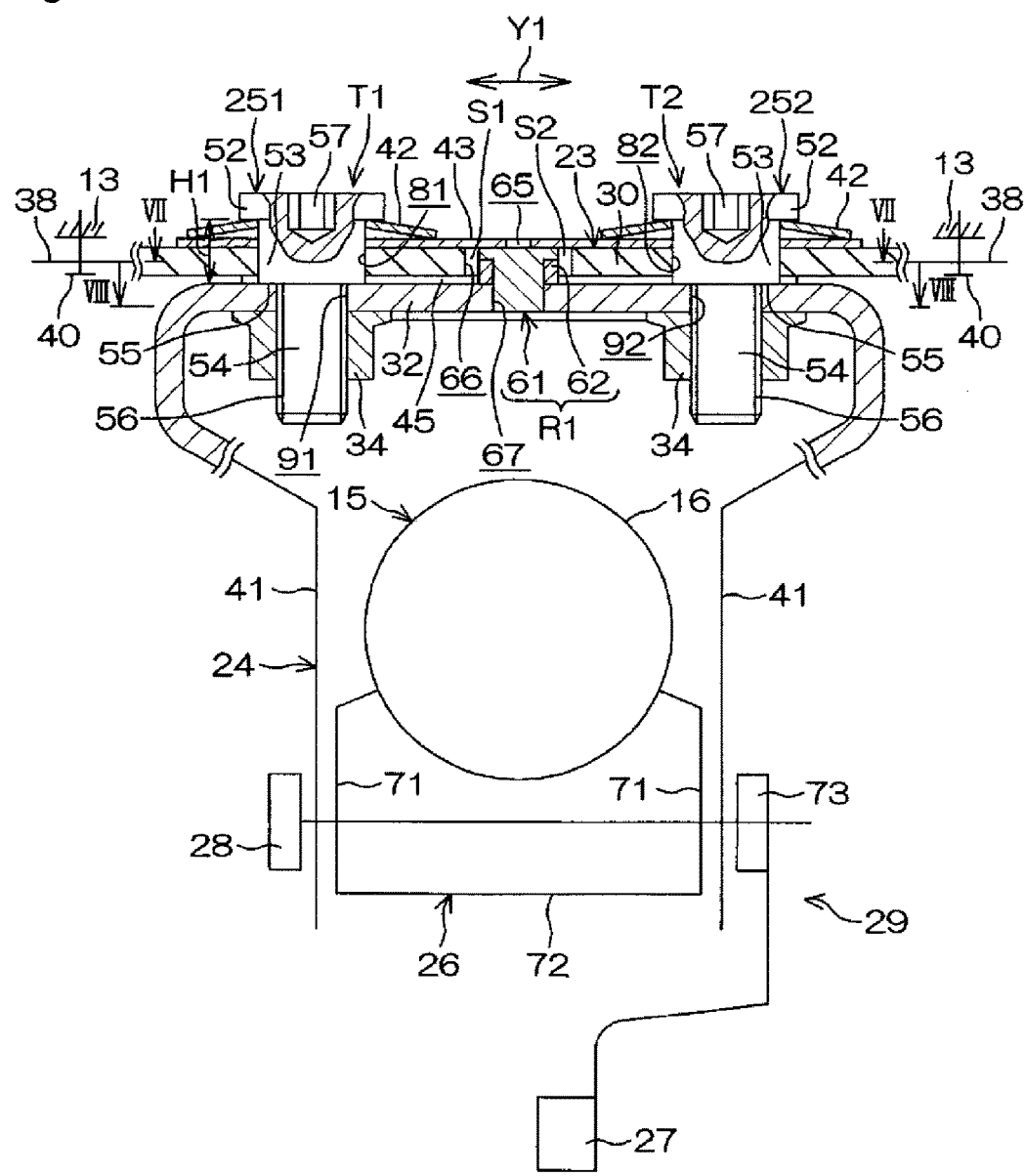
FIG. 2 is a schematic sectional view of the steering device of the first embodiment, which shows a section taken along a line II-II in FIG. 1.

As shown in FIG. 2 which is a schematic sectional view, the steering device 1 includes the pair of suspending mechanism T1, T2 which suspend the upper jacket 16 via the tilt bracket 24, which is a movable bracket, by the use of the fixed bracket 23. Namely, as shown in FIGS. 1 and 2, the tilt bracket 24, which is the movable bracket, is suspended from the fixed bracket 23 which is fixed to the vehicle body-side member 13 via suspending bolts 251, 252 which are suspending shafts of the suspending mechanisms T1, T2. On the other hand, a column bracket 26 is fixed to the upper jacket 16 of the steering column 15.

As shown in FIGS. 1 and 2, the steering device 1 includes the lock mechanism 29 which locks or unlocks the position of the column bracket 26 (and hence, the positions of the upper jacket 16 and the steering member 2) after a tilting adjustment via the tilt bracket 24 by means of a fastening shaft 28 which moves in response to the operation of an operation lever 27.

Figure 3:
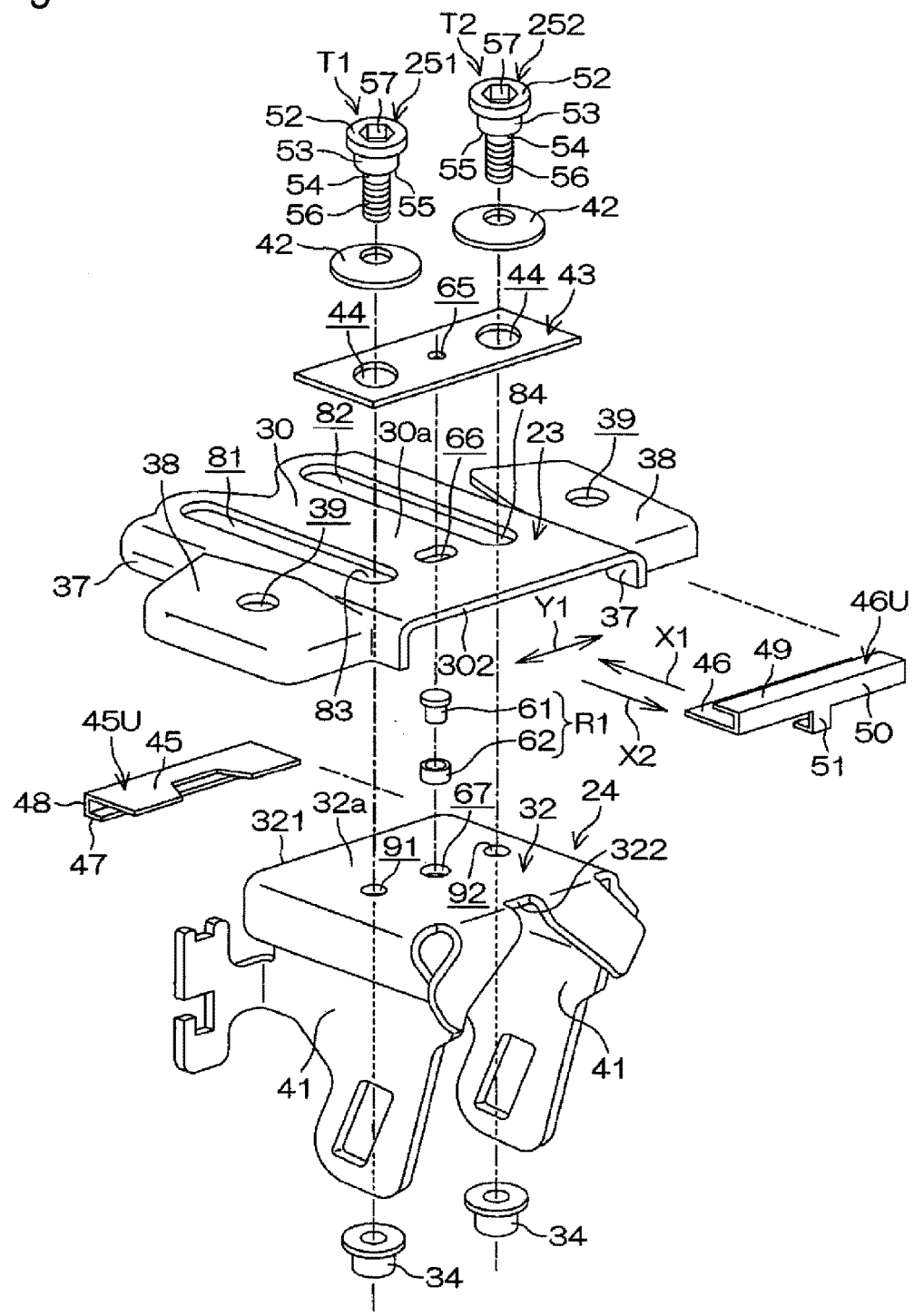
FIG. 3 is an exploded perspective view of the steering device of the first embodiment.

As shown in FIGS. 2, 3, the tilt bracket 24 includes a pair of side plates 41. As shown in FIG. 2, the column bracket 26 includes a pair of side plates 71 which face individually the pair of side plates 41 of the tilt bracket 24 and a connecting plate 72 which connects lower ends of the pair of side plates 71 together.

Referring to FIG. 2, the fastening shaft 28 is made up of a bolt which penetrates the side plates 41, 71 of the tilt bracket 24 and the column bracket 26. By rotating a nut 73 which is screwed on the fastening shaft 28 by rotating the operation lever 27, both the side plates 41, 71 are fastened between a head portion of the bolt as the fastening shaft 28 and the nut 73 to thereby lock both the side plates 41, 71. This serves to lock the position of the steering member 2 after the tilting adjustment, whereby a tilting lock is attained.

Figure 5:
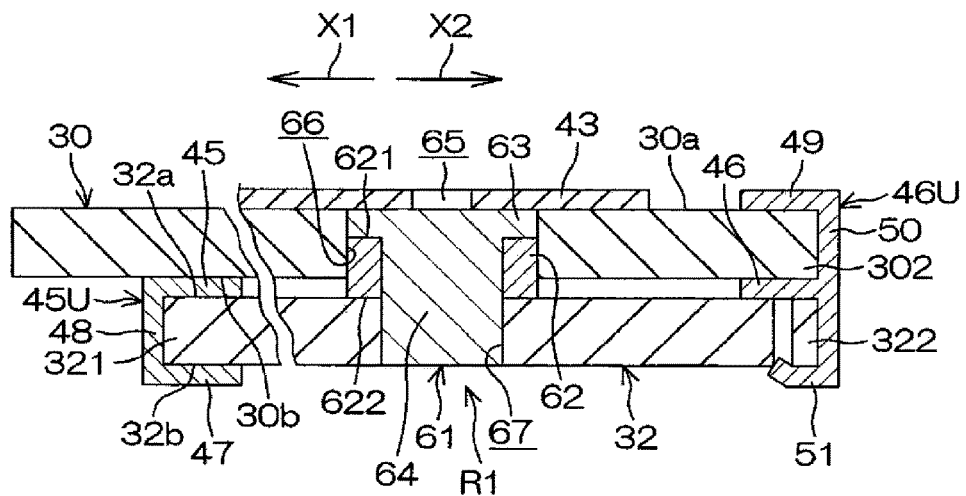
FIG. 5 is a sectional view of a state in which a first plate and a second plate are connected together, which shows a section in a front-to-rear direction including an axis of a resin pin in the first embodiment.
Figure 6:
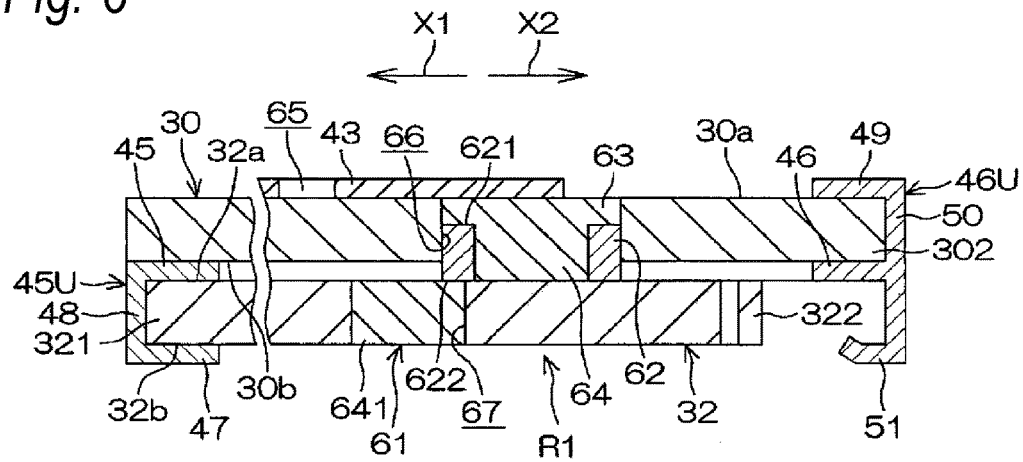
FIG. 6 is a sectional view of the first plate and the second plate at the time of a secondary collision, which shows a state in which the second plate is dislocated from a predetermined position of the first plate in a column moving direction as a result of the shearing of the resin pin in the first embodiment.

In addition, the steering device 1 includes the connecting-disconnecting mechanism R1 which connects a first plate 30 of the fixed bracket 23 and a second plate 32 of the tilt bracket 24 and which dislocates the second plate 32 from a predetermined position (a position shown in FIG. 5) of the first plate 30 towards a column moving direction X1 as shown in FIG. 6 when a secondary collision occurs.

Figure 4:
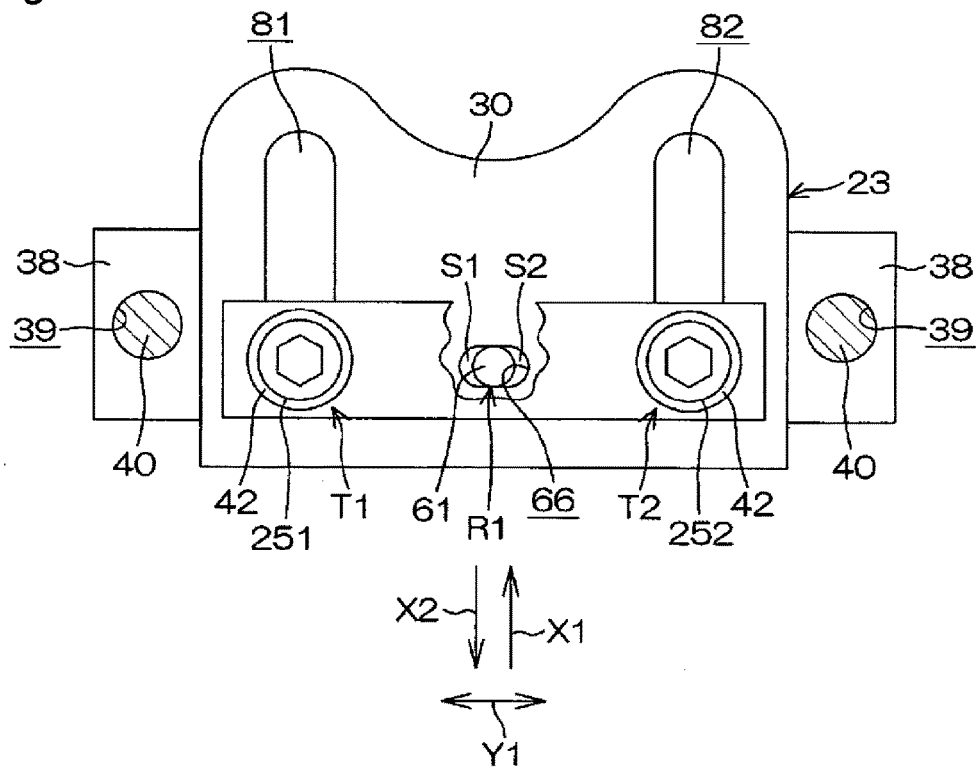
FIG. 4 is a partially broken schematic plan view of a fixed bracket, both suspending mechanisms, and a connecting-disconnecting mechanism of the first embodiment.

As shown in FIG. 2 and FIG. 4 which is a partially broken schematic plan view, the connecting-disconnecting mechanism R1 is disposed between the pair of suspending mechanisms T1, T2 (that is, between a pair of elongated holes 81, 82, which will be described later, of the first plate 30 of the fixed bracket 23) with respect to a direction Y1 which is at right angles to the column moving direction X1. Specifically speaking, the connecting-disconnecting mechanism R1 is disposed in a central position between the pair of elongated holes 81, 82 (that is, between the pair of suspending bolts 251, 252) with respect to the direction Y1 which is at right angles to the column moving direction X1.

Referring to FIG. 1, the fixed bracket 23 includes the first plate 30 which is parallel to the column moving direction X1 (which corresponds to an axial direction of the steering shaft 3) when a secondary collision occurs. The elongated holes 81, 82 for the suspending mechanisms T1, T2 are formed in the first plate 30 so as to extend parallel to the column moving direction X1. On the other hand, the tilt bracket 24 (the movable bracket) includes the second plate 32 which faces the first plate 30. The circular holes 91, 92 for the suspending mechanisms T1, T2 are formed in the second plate 32, and the circular holes 91, 92 face portions of the elongated holes 81, 82, respectively.

The suspending bolts 251, 252 are made up of bolts which pass through the corresponding elongated holes 81, 82 in the first plate 30 and the corresponding circular holes 91, 92 in the second plate 32 to screw into corresponding nuts 34. The suspending bolts 251, 252 which connect the first plate 30 and the second plate 32 together in cooperation with the nuts 34 suspend the upper jacket 16 (the movable jacket) via the tilt bracket 24 (the movable bracket) and the column bracket 26. The suspending bolts 251, 252 can move in the column moving direction X1 along the corresponding elongated slots 81, 82 together with the tilt bracket 24 (the movable bracket), the column bracket 26 and the upper jacket 16 when a secondary collision occurs.

A lower bracket 35 which is fixed to the vehicle body-side member 14 supports a tilting center shaft 36 which is a pivot shaft. The tilting center shaft 36 supports the lower jacket 17 via the housing 18 of the steering column 15 so as to oscillate about the tilting center shaft 36.

As shown in FIGS. 2 and 3, the suspending mechanisms T1, T2 are made up of the corresponding suspending bolts 251, 252, plate springs 42 which are made up of coned disc springs, for example, and the nuts 34. The connecting-disconnecting mechanism R1 is made up of a resin pin 61 which shears when a secondary collision occurs and a cylindrical collar 62 which fits on an axial portion of the resin pin 61. The collar 62 is formed of a material which is harder than a resin from which the resin pin 61 is formed (for example, metal such as iron and aluminum, hard resin or ceramic, and the like).

Referring to FIG. 3, the fixed bracket 23 includes a pair of side plates 37 which are provided so as to extend individually downwards from a pair of side edges of the first plate 30 and a pair of mounting plates 38 which are provided so as to extend individually outwards from the pair of side plates 37. The fixed bracket 23 is formed of a metallic plate, for example. The mounting plates 38 are fixed individually to the vehicle body-side member 13 by fixing bolts 40 (refer to FIG. 4) which are inserted through threaded insertion holes 39 (refer to FIGS. 3 and 4) which are provided individually in the mounting plates 38. This enables the fixed bracket 23 to be fixed to the vehicle body-side member 13.

Referring to FIGS. 2 to 4, in the first plate 30 of the fixed bracket 23, the pair of elongated holes 81, 82 are provided so as to correspond to the pair of suspending bolts 251, 252, respectively. The pair of elongated holes 81, 82 extend parallel to the column moving direction X1 when a second collision occurs and are situated apart from each other in the direction Y1 which is at right angles to the column moving direction X1.

As shown in FIGS. 2, 3, the tilt bracket 24 (the movable bracket) is formed of a metallic plate, for example. The tilt bracket 24 includes the second plate 32 and the pair of side plates 41 which are provided so as to extend individually downwards from the pair of side edges of the second plate 32. Connecting portions between the second plate 32 and the individual side plates 41 may be formed to be curved as shown in FIGS. 2, 3.

In the second plate 32 of the tilt bracket 24, the pair of circular holes 91, 92 are provided so as to correspond to the pair of suspending bolts 251, 252, respectively. The suspending bolts 251, 252 pass sequentially through the annular plate springs 42 which are made up of the coned disc springs, for example, corresponding through holes 44 in a first interposed plate 43, the corresponding elongated holes 81, 82 in the first plate 30 and the corresponding circular holes 91, 92 in the second plate 32 to thereby be screwed into the corresponding nuts 34. This enables both the suspending bolts 251, 252 to suspend the tilt bracket 24.

The first interposed plate 43 is made up of a long plate which extends in the direction Y1 which is at right angles to the column moving direction X1 as shown in FIGS. 3 and 4 and is interposed between both the plate springs 42 and an upper surface 30a of the first plate 30 as shown in FIG. 2. At least a surface of a side of the first interposed plate 43 which faces the first plate 30 is formed from a low friction material such as a fluorine plastic, for example. Namely, the whole of the first interposed plate 43 may be formed from the low friction material, or the low friction material may be coated on the surface of the side of the first interposed plate 43 which faces the first plate 30.

A second interposed plate 45 and a third interposed plate 46 are interposed between the first plate 30 and the second plate 32, and the second interposed plate 45 and the third interposed plate 46 work to reduce a sliding resistance generated when the second plate 32 moves in the column moving direction X1 relative to the first plate 30 at the time of a secondary collision.

The second interposed plate 45 makes up a groove-shaped unit 45U which is locked at a first end portion 321 which is an end portion of the second plate 32 which is situated to face in the column moving direction X1. Namely, the unit 45U includes the second interposed plate 45 which follows an upper surface 32a of the second plate 32 and a lower surface 30b of the first plate 30, an opposing plate 47 which faces the second interposed plate 45 and follows a lower surface 32b of the second plate 32 and a connecting plate 48 which connects the second interposed plate 45 and the opposing plate 47 together and which is brought into abutment with an end edge of the second plate 32 which is situated to face in the column moving direction X1.

At least a surface of a side of the second interposed plate 45 which faces the first plate 30 is formed from a low friction material such as a fluorine plastic, for example. Namely, the second interposed plate 45 or the unit 45U may be formed of the low friction material, or the low friction material may be coated on the surface of the second interposed plate 45 which faces the first plate 30.

The third interposed plate 46 makes up a unit 46U which is locked at a second end portion 302 which is an end portion of the first plate 30 which is situated to face in an opposite direction to the column moving direction X1 and a second end portion 322 which is an end portion of the second plate 32 which is situated to face in the opposite direction to the column moving direction X1. Namely, the unit 46U includes the third interposed plate 46 which follows the upper surface 32a of the second plate 32 and the lower surface 30b of the first plate 30 and an opposing plate 49 which faces the third interposed plate 46 and follows the upper surface 30a of the first plate 30. The unit 46U includes a connecting plate 50 which connects the third interposed plate 46 and the opposing plate 49 together and which is brought into abutment with an end edge of the first plate 30 which is situated to face in the opposite direction to the column moving direction X1 and a locking portion 51 having a hook shape, for example, which is hooked on the second end portion 322 of the second plate 32.

At least a surface of a side of the third interposed plate 46 which faces the second plate 32 is formed from a low friction material such as a fluorine plastic, for example. Namely, the third interposed plate 46 or the unit 46U may be formed of the low friction material, or the low friction material may be coated on the surface of the third interposed plate 46 which faces the second plate 32.

As shown in FIGS. 2 and 3, the suspending bolts 251, 252 each include a head portion 52, a large diameter portion 53, function as an elongated hole inserted portion, which continues to the head portion 52 and which is smaller in diameter than the head portion 52, a small diameter portion 54 which continues to the large diameter portion 53 and which is smaller in diameter than the large diameter portion 53, a stepped portion 55 which is formed between the large diameter portion 53 and the small diameter portion 54 and a threaded portion 56 which is provided on the small diameter portion 54. A tool engagement portion 57 which is formed into a hexagonal hole, for example, is provided on the head portion 52.

As shown in FIG. 2, the large diameter portions 53 (the elongated hole inserted portion) pass through the annular plate springs 42, the through holes 44 in the first interposed plate 43, and the corresponding elongated holes 81, 82 in the first plate 30. The stepped portions 55 are in abutment with the upper surface 32a of the second plate 32 and is borne by the upper surface 32a. The second plate 32 is held between the stepped portions 55 and the nuts 34, whereby the suspending bolts 251, 252 and the second plate 32 are fixed together.

A space H1 between the head portion 52 and the stepped portion 55 (which corresponds to an axial length of the large diameter portion 53) is made greater than a total of a thickness of the second interposed plate 45 (or a thickness of the third interposed plate 46) which is interposed between the first plate 30 and the second plate 32, a thickness of the first plate 30, a thickness of the first interposed plate 43 which follows the upper surface 30a of the first plate 30 and a thickness of the plate spring 42 when the plate spring 42 is compressed to a maximum extent. This allows the plate springs 42 to bias elastically the first plate 30 via the first interposed plate 43 towards the second plate 32.

The resin pin 61 of the connecting-disconnecting mechanism R1 includes a head portion 63 having a circular section, for example, and a cylindrical shaft portion 64 which is smaller in diameter than the head portion 63. The cylindrical collar 62 is fitted on an outer circumference of the shaft portion 64. An outside diameter of the collar 62 is equal to an outside diameter of the head portion 63 of the resin pin 61. An axial first end portion 621 of the collar 62 is brought into abutment with the head portion 63 of the resin pin 61, and an axial second end portion 622 of the collar 62 is borne by the upper surface 32a of the second plate 32. This prevents the resin pin 61 and the collar 62 from falling from the second plate 32.

On the other hand, the first interposed plate 43 is disposed so as to cover the head portion 63 of the resin pin 61 from thereabove, whereby the resin pin 61 is prevented from being dislocated upwards. Additionally, an inspection hole 65, which is smaller in bore diameter than an outside diameter of the head portion 63, is formed in the first interposed plate 43 so as to face the head portion 63 of the resin pin 61. It is possible to determine easily on such a working failure as failing to assemble the resin pin 61 by visualizing the head portion 63 of the resin pin 61 through the inspection hole 65 in the first interposed plate 43 after the assemblage of the connecting-disconnecting mechanism R1.

The head portion 63 of the resin pin 61 and most of the collar 62 are inserted into a first hole 66 which is formed in the first plate 30 of the fixed bracket 23 for the connecting-disconnecting mechanism R1. Part of the collar 62 projects from the first hole 66. A portion 641 of the shaft portion 64 of the resin pin 61 which projects from the collar 62 is inserted into a second hole 67 which is formed in the second plate 32 of the tilt bracket 24 (the movable bracket) for the connecting-disconnecting mechanism R1. When a secondary collision occurs, as shown in FIGS. 5 to 6, the portion 641 of the shaft portion 64 of the resin pin 61 shears so as to be separated from the remainder in association with a relative movement of the first plate 30 and the second plate 32.

Figure 7:
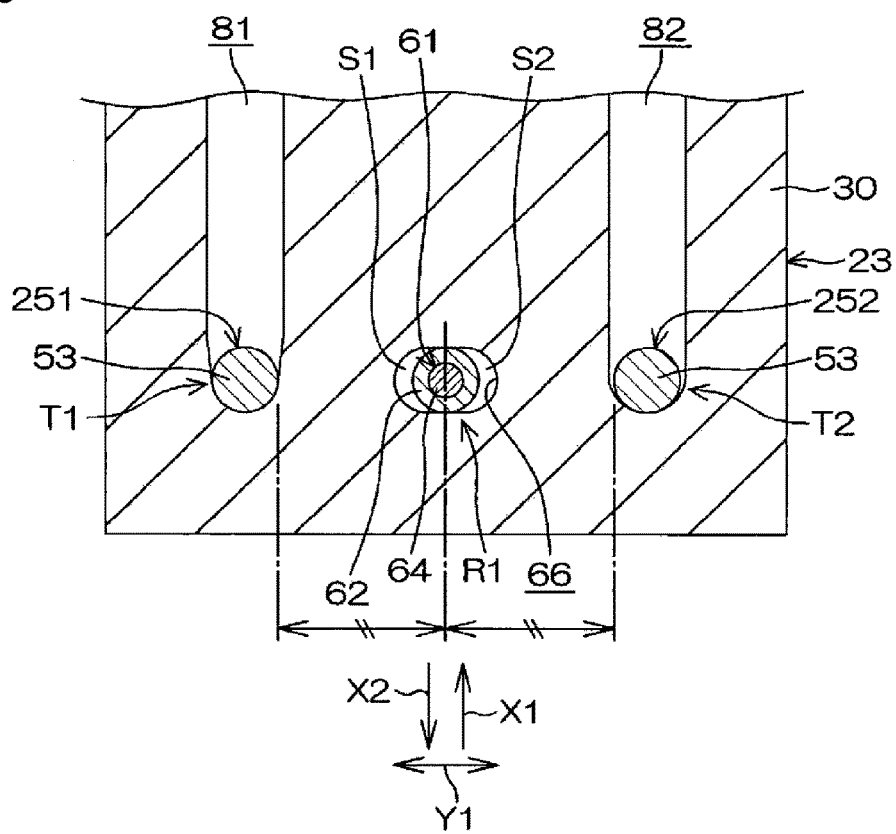
FIG. 7 is a sectional view taken along a line VII-VII in FIG. 2, which shows sections of the first plate, both the suspending bolts and the connecting-disconnecting mechanism in the first embodiment.

As shown in FIG. 7 which is a sectional view taken along a line VII-VII in FIG. 2, the first hole 66 formed in the first plate 30 for the connecting-disconnecting mechanism R1 is disposed in a central position between the elongated holes 81, 82 for the pair of suspending mechanisms T1, T2 with respect to the direction Y1 which is at right angles to the column moving direction X1. Namely, the resin pin 61 is disposed in a central position between the pair of suspending bolts 251, 252 with respect to the direction Y1 which is at right angles to the column moving direction X1. The large diameter portions 53, functioning as the elongated hole inserted portions, of the suspending bolts 251, 252 are inserted through the corresponding elongated holes 81, 82.

The first hole 66 formed in the first plate 30 for the connecting-disconnecting mechanism R1 is formed into a horizontally elongated hole which is long in the direction Y1 which is at right angles to the column moving direction X1. This provides gaps S1, S2 between an outer circumference of the collar 62 and an inner circumference of the first hole 66 with respect to the direction Y1 which is at right angles to the column moving direction X1.

Due to the existence of these gaps, even though the first plate 30 and the second plate 32 are caused to deflect from each other in the direction Y1 which is at right angles to the column moving direction X1 as a result of some external force being exerted thereon when transported or assembled, there is no such situation that the resin pin 61 shears.

Figure 8:
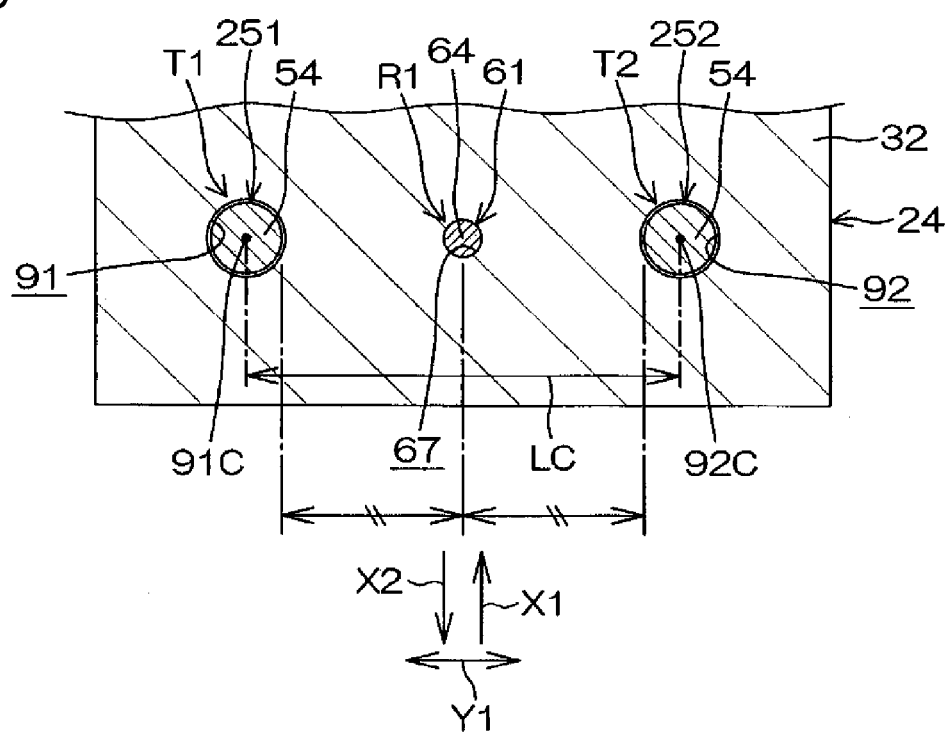
FIG. 8 is a sectional view taken along a line VIII-VIII in FIG. 2, which shows sections of the second plate, both the suspending bolts and the connecting-disconnecting mechanism in the first embodiment.

As shown in FIG. 8 which is a sectional view taken along a line VIII-VIII in FIG. 2, the second hole 67 formed in the second plate 32 of the tilt bracket 24 for the connecting-disconnecting mechanism R1 is disposed in a central position between the pair of circular holes 91, 92 which are formed for the pair of suspending mechanisms T1, T2, respectively, with respect to the direction Y1 which is at right angles to the column moving direction X1. The second hole 67 is formed by a circular hole having a bore diameter which is equal to or slightly greater than an outside diameter of the shaft portion 64 of the resin pin 61. The small diameter portions 54 of the suspending bolts 251, 252 are inserted through the corresponding circular holes 91, 92.

When a secondary collision occurs, mating surfaces of the second end portion 622 of the collar 62 and the second plate 32 deflect, whereby the shaft portion 64 of the resin pin 61 is sheared. A shearing blade which is made up of an inner circumferential edge of the second end portion 622 of the collar 62 has an ark-like shape, and a shearing blade which is made up of an edge portion of the second hole 67 in the second plate 32 also has an arc-like shape.

Figure 9:
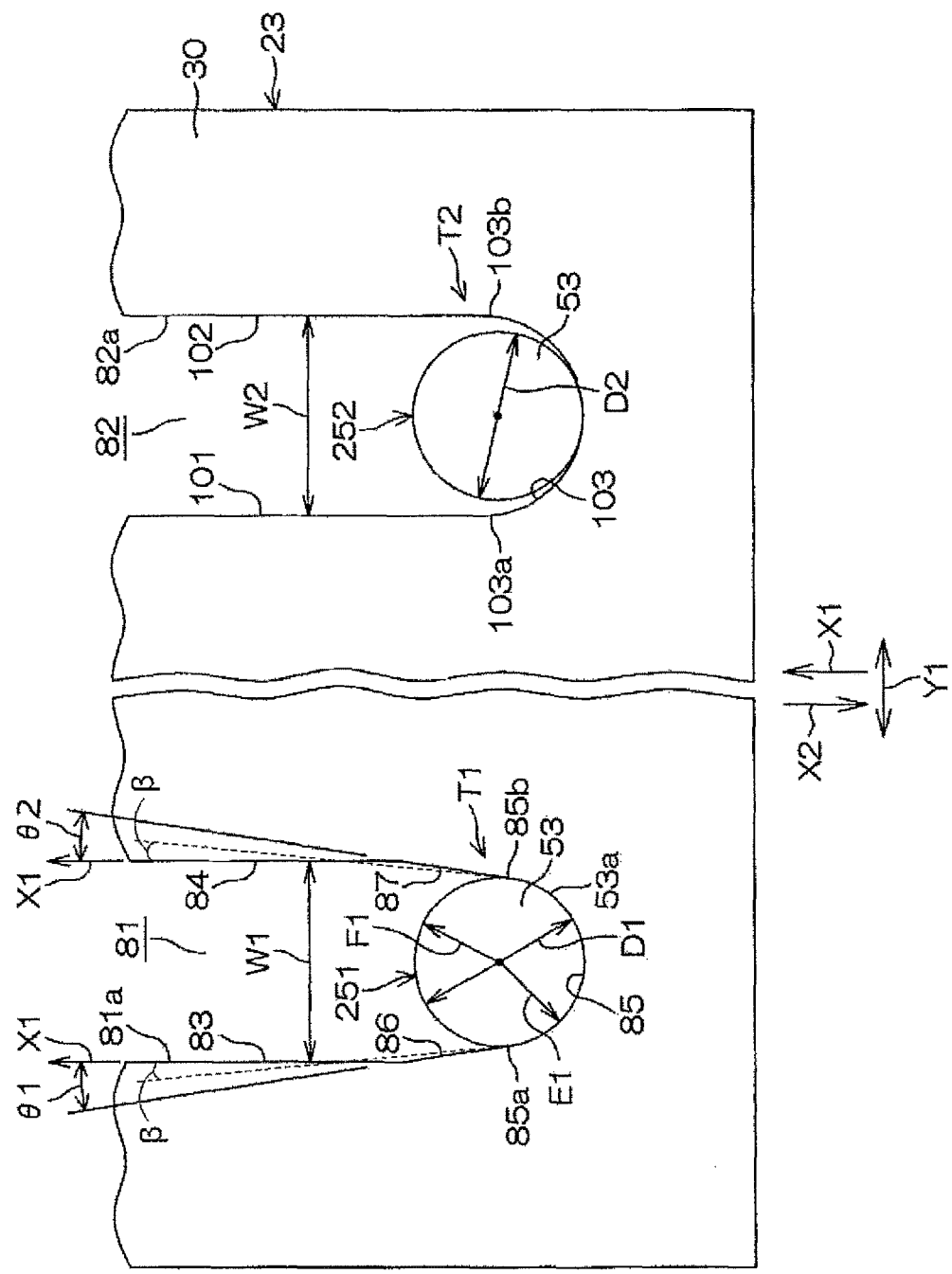
FIG. 9 is an enlarged schematic view of a portion in FIG. 7 showing both elongated holes in the first plate and both the suspending bolts. Hatching on the sections of the first plate and both the suspending bolts are omitted.

Next, FIG. 9 shows a relationship between the pair of elongated holes 81, 82 in the first plate 30 and the large diameter portions 53, functioning as the elongated hole inserted portions, of the suspending bolts 251, 252 which are disposed in the initial assembling positions relative to the pair of elongated holes 81, 82. In FIG. 9, sections of the first plate 30 and the suspending bolts 251, 252 are not hatched.

Referring to FIG. 9, an inner circumference 81a of the elongated hole 81, which is one of the elongated holes 81, 82 in the first plate 30, includes a pair of flat surface portions 83, 84 which extend parallel to the column moving direction X1, a concavely arc-shaped surface portion 85, and a pair of tapered surface portions 86, 87 which connect the arc-shaped surface portion 85 to the pair of flat surface portions 83, 84, respectively.

A space W1 between the pair of flat surface portions 83, 84 is greater than an outside diameter D1 of the large diameter portion 53, which is the elongated hole inserted portion, of the corresponding suspending bolt 251 (W1>D1). The arc-shaped surface portion 85 bears a portion of an outer circumference 53a of the large diameter portion 53, which is the elongated hole inserted portion, of the corresponding suspending bolt 251 which is disposed in the initial assembling position (corresponding to the position of an end portion of the elongated hole 81 which faces in an opposite direction X2 to the column moving direction X1). A radius of curvature E1 of the arc-shaped surface portion 85 is equal to or greater than a radius F1 (F1=D1/2) of the outer circumference 53a of the large diameter portion 53, which is the elongated hole inserted portion, of the suspending bolt 251 (E1≥F1).

On the other hand, the pair of tapered surface portions 86, 87 extend from a pair of end portions 85a, 85b of the arc-shaped surface portion 85, respectively, in tangential directions which are inclined relative to the column moving direction X1 to connect to the corresponding flat surface portions 83, 84. The tapered surface portions 86, 87 may connect to the corresponding flat surface portions 83, 84 via round portions. The tapered surface portions 86, 87 are inclined in opposite directions at an equal angle relative to the column moving direction X1. Namely, angles θ1, θ2 which the tapered surface portions 86, 87 form relative to the column moving direction X1 are equal to each other (θ1=θ2) and is equal to or greater than a friction angle β (θ1≥β, θ2≥β). FIG. 9 (and FIG. 10, described later) illustrates an example in which the angles θ1, θ2 are greater than the friction angle β (θ1≥β, θ2≥β).

An inner circumference 82a of the other elongated hole 82 includes a pair of flat surface portions 101, 102 which extend parallel to the column moving direction X1 and a concavely arc-shaped surface portion 103. A space W2 of the pair of flat surface portions 101, 102 is greater than an outside diameter D2 of the elongated hole inserted portion (the large diameter portion 53) of the corresponding suspending bolt 252 (W2>D2). The arc-shaped surface portion 103 bears a portion of an outer circumference 53a of the elongated hole inserted portion (the large diameter portion 53) of the corresponding suspending bolt 252 which is disposed in the initial assembling position (corresponding to the position of an end portion of the elongated hole 82 which faces in the opposite direction X2 to the column moving direction X1). The flat surface portions 101, 102 extend from corresponding end portions 103a, 103b of the arc-shaped surface portion 103, respectively, in a tangential direction which is parallel to the column moving direction X1.

According to the first embodiment, on the inner circumference 81a of the elongated hole 81 which is one of the pair of elongated holes 81, 82, the tapered angles θ1, θ2 which the tapered surface portions 86, 87 form relative to the column moving direction X1 are equal to or greater than the friction angle β (θ1≥β, θ2≥β). Consequently, when a secondary collision occurs, the elongated hole inserted portion (the large diameter portion 53) of the suspending bolt 251 can move (be dislocated) smoothly from the initial assembling position in the column moving direction X1 without being caught. Consequently, it is possible to suppress the increase in the dislocating load.

Second Embodiment

Figure 10:
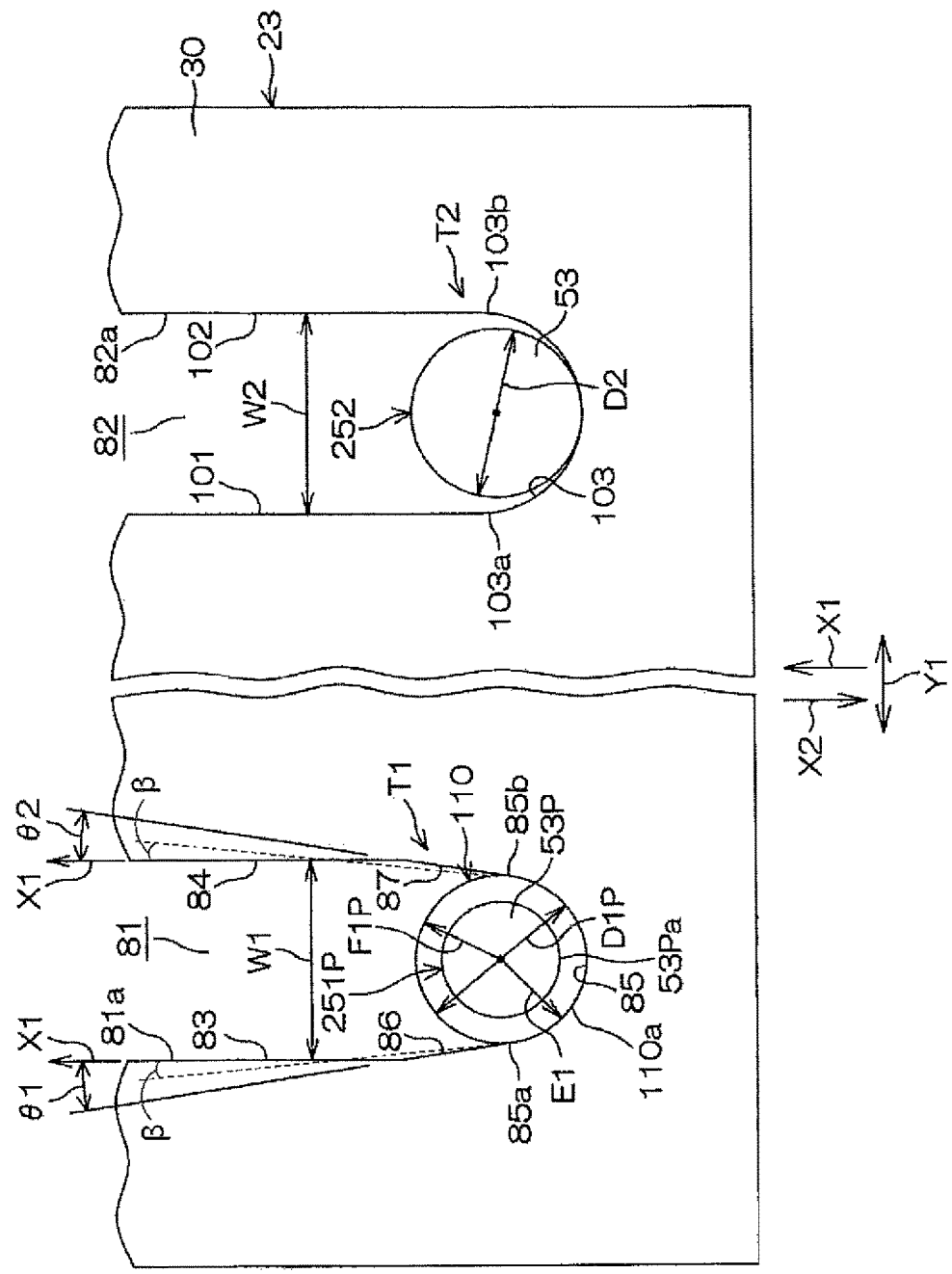
FIG. 10 is a schematic view of both elongated holes in a first plate and both suspending bolts in a second embodiment. Hatching on the sections of the first plate and both the suspending bolts are omitted.

Next, FIG. 10 shows a second embodiment of the invention. Referring to FIG. 10, in a second embodiment, a rotary member 110 is provided. This rotary member 110 is fitted rotatably on a large diameter portion 53P (an elongated hole inserted portion) of a suspending bolt 251P which is inserted through one elongated hole 81 and is brought into rolling contact with an inner circumference 81a of the elongated hole 81.

The rotary member 110 surrounds the large diameter portion 53P (the elongated hole inserted portion) of the suspending bolt 251P and functions as a surface pressure concentration lessening member which lessens the concentration of a surface pressure on an inner circumference 81a of the elongated hole 81. The rotary member 110 may be an annular member like one shown in the figure, for example, and this annular member is fitted rotatably on an outer circumference 53Pa of the large diameter portion 53P. As this occurs, the annular member may be formed from a low friction member such as a fluorine plastic on an inner circumference and an outer circumference thereof. Although not shown, a ball bearing may be used as the rotary member.

A space W1 between a pair of flat surface portions 83, 84 of the elongated hole 81 is greater than an outside diameter D1P of the rotary member 110 which is fitted on the large diameter portion 53P (the elongated hole inserted portion) of the corresponding suspending bolt 251 (W1>D1P). An arc-shaped surface portion 85 bears a portion of an outer circumference 110a of the rotary member 110 which is fitted on the outer circumference 53Pa of the large diameter portion 53P (the elongated hole inserted portion) of the corresponding suspending bolt 251 which is disposed in an initial assembling position (corresponding to the position of an end portion of the elongated hole 81 which faces in an opposite direction X2 to the column moving direction X1). A radius of curvature E1 of the arc-shaped surface portion 85 is equal to or greater than a radius F1P (F1P=D1P/2) of the outer circumference 110a of the rotary member 110 which is fitted on the outer circumference 53Pa of the large diameter portion 53P of the suspending bolt 251 (E1≥F1P).

Like reference numerals to those given to the constituent elements of the first embodiment shown in FIG. 9 are given to like constituent elements of the second embodiment shown in FIG. 10 to those of the first embodiment shown in FIG. 9.

According to the second embodiment, when a secondary collision occurs, the rotary member 110, which is the surface pressure concentration lessening member which surrounds the elongated hole inserted portion (the large diameter portion 53P) of the suspending bolt 251, rolls on the inner circumference 81a of the elongated hole 81 to thereby lessen a local concentration of surface pressure on the inner circumference 81a of the elongated hole 81. Therefore, the elongated hole inserted portion (the large diameter portion 53P) can smoothly move (be dislocated) from the initial assembling portion.

Here, in the event of the space W1 between the pair of flat surface portions 83, 84 of the inner circumference 81a of the elongated hole 81 being equal to a space W2 between a pair of flat surface portions 101, 102 of an inner circumference 82a of the other elongated hole 82, the outside diameter of the elongated hole inserted portion (the large diameter portion 53P) which is inserted through the elongated hole 81 becomes smaller than an outside diameter D1 of an elongated hole inserted portion (a large diameter portion 53) which is inserted through the elongated hole 82. On the other hand, in the event of an outside diameter of the elongated hole inserted portion (the large diameter portion 53P) which is inserted through the elongated hole 81 being equal to an outside diameter D1 of the elongated hole inserted portion (the large diameter portion 53) which is inserted through the elongated hole 82, the space W1 between the pair of flat surface portions 83, 84 of the elongated hole 81 becomes greater than the space W2 between the pair of flat surface portions 101, 102 of the elongated hole 82.

Third Embodiment

Figure 11:
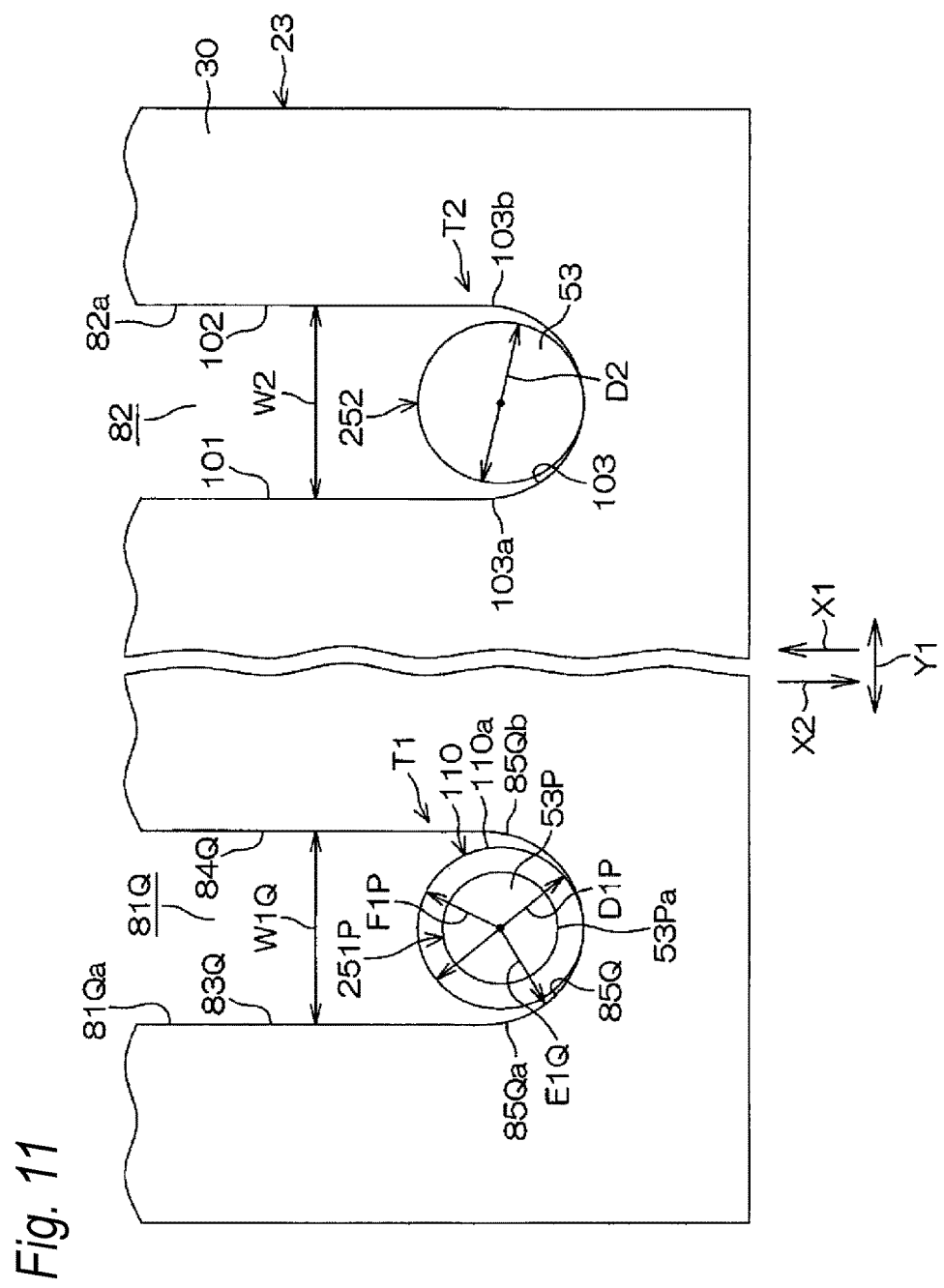
FIG. 11 is a schematic view of both elongated holes in a first plate and both suspending bolts in a third embodiment. Hatching on the sections of the first plate and both the suspending bolts are omitted.

FIG. 11 shows a third embodiment of the invention. The third embodiment shown in FIG. 11 differs from the second embodiment shown in FIG. 10 in that in the second embodiment shown in FIG. 10, the tapered surface portions 86, 87 are interposed between the arc-shaped surface portion 85 and the pair of flat surface portions 83, 84 on the inner circumference 81a of the one elongated hole 81. In contrast to this, in the third embodiment shown in FIG. 11, on an inner circumference 81Qa of an elongated hole 81Q, a pair of flat surface portions 83Q, 84Q extend directly from a pair of end portions 85Qa, 85Qb of an arc-shaped surface portion 85Q, respectively, in a column moving direction X1 which is a tangential direction. A space W1Q between the pair of flat surface portions 83Q, 84Q is greater than an outside diameter D1P of a rotary member 110 (W1Q>D1P). A radius of curvature E1Q of the arc-shaped surface portion 85Q is equal to or greater than a radius F1P of an outer circumference 110a of the rotary member 110 (E1Q≥F1P).

Like reference numerals to those given to the constituent elements of the second embodiment shown in FIG. 10 are given to like constituent elements of the third embodiment shown in FIG. 11 to those of the second embodiment shown in FIG. 10. In the third embodiment, too, the same working effect as that of the second embodiment shown in FIG. 10 can be provided. In the third embodiment, although the rotary member 110, which is the surface pressure concentration lessening member, is provided only in the one elongated hole 81, the rotary member 110 may be provided only in the other elongated hole 82, or the rotary member 110 may be provided in both the elongated holes 81, 82.

Fourth Embodiment

Figure 12:
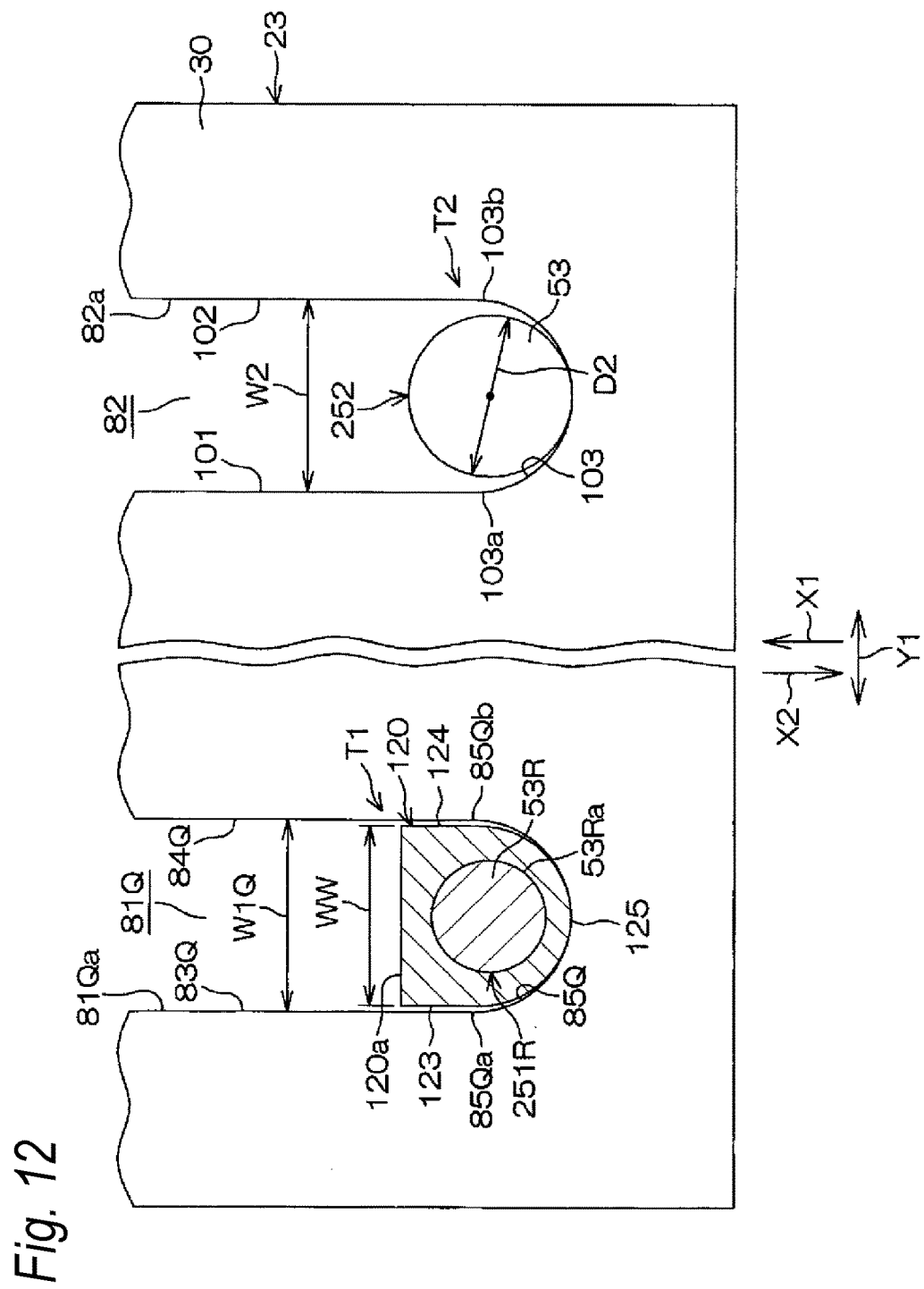
FIG. 12 is a schematic view of both elongated holes in a first plate and both suspending bolts in a fourth embodiment.
Figure 13:
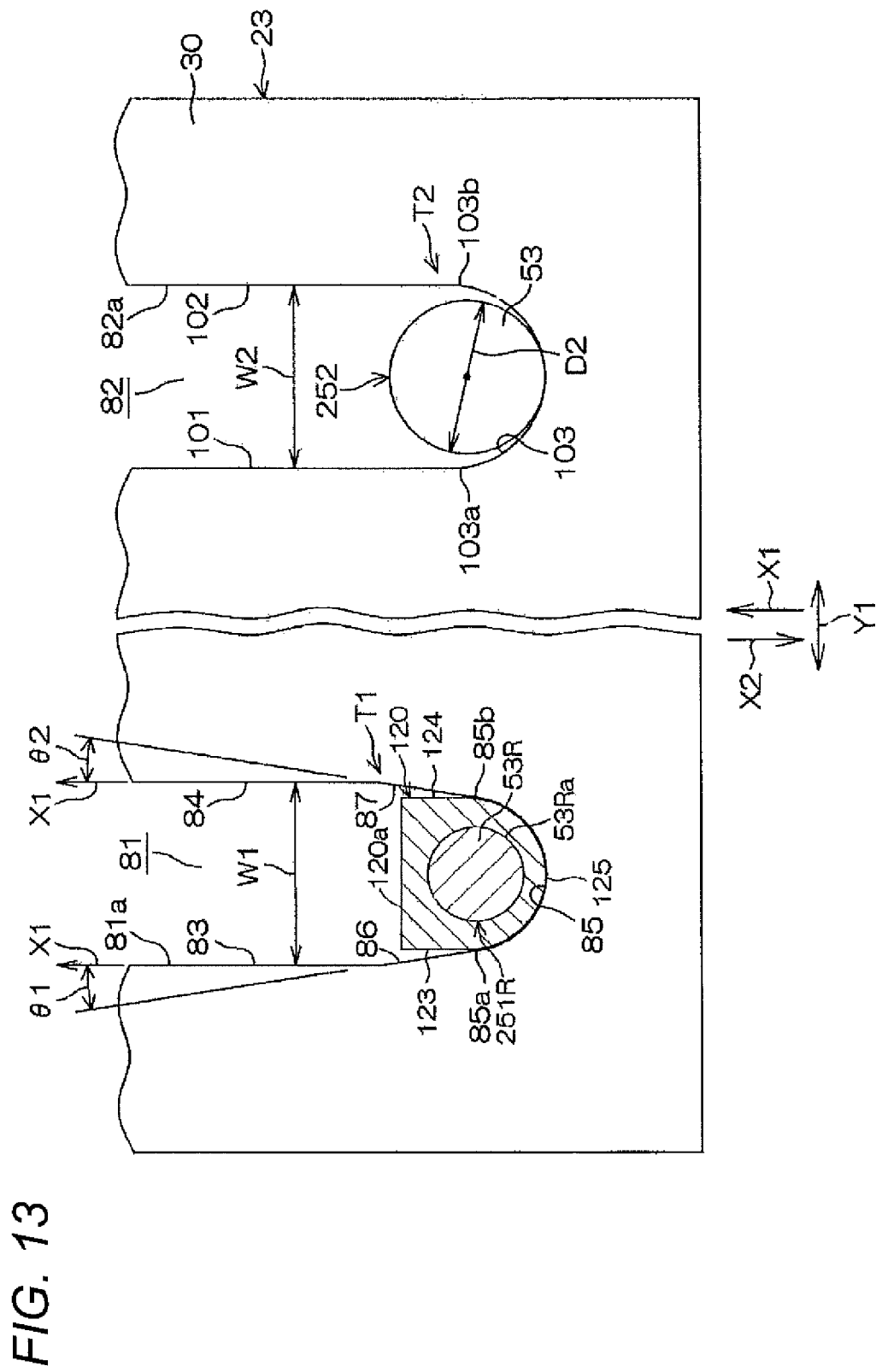
FIG. 13 is a schematic view of both elongated holes in a first plate and both suspending bolts in a fifth embodiment. Hatching on the sections of the first plate and both the suspending bolts are omitted.

FIG. 12 shows a fourth embodiment of the invention. The fourth embodiment shown in FIG. 12 differs from the third embodiment shown in FIG. 11 mainly in the following point. Namely, in the third embodiment shown in FIG. 11, the rotary member 110 is used as the surface pressure concentration lessening member.

In contrast to this, in the fourth embodiment shown in FIG. 12, a sliding member 120 is provided. This sliding member 120 is fitted rotatably on a large diameter portion 53R (an elongated hole inserted portion) of a suspending bolt 251R which is inserted through one elongated hole 81Q and is brought into sliding contact with an inner circumference 81Qa of the elongated hole 81Q. The sliding member 120 surrounds the large diameter portion 53R (the elongated hole inserted portion) of the suspending bolt 251R and functions as a surface pressure concentration lessening member which lessens the concentration of surface pressure on the inner circumference 81Qa of the elongated hole 81Q.

An outer circumference 120a of the sliding member 120 includes a pair of flat surface portions 123, 124 which extend parallel to a column moving direction X1 while facing a pair of flat surface portions 83Q, 84Q of the elongated hole 81Q, respectively, and a convexly arc-shaped surface portion 125 which connects end portions of the pair of flat surface portions 123, 124 and which fits in a concavely arc-shaped surface portion 85Q of the elongated hole 81Q.

On the outer circumference 120a of the sliding member 120, at least the pair of flat surface portions 123, 124 are formed from a low friction material such as a fluorine plastic. The whole of the sliding member 120 may be made from the low friction material, or the low friction material may be coated on at least the pair of flat surface portions 123, 124.

A space W1Q between the pair of flat surface portions 83Q, 84Q of the elongated hole 81Q is greater than a space WW between the pair of flat surface portions 123, 124 of the sliding member 120 (W1Q>WW).

Like reference numerals to those given to the constituent elements of the third embodiment shown in FIG. 11 are given to like constituent elements of the fourth embodiment shown in FIG. 12 to those of the third embodiment shown in FIG. 11.

According to the fourth embodiment, when a secondary collision occurs, the sliding member 120 which is fitted on the elongated hole inserted portion (the large diameter portion 53R) of the suspending bolt 251R slides on the inner circumference 81Qa of the elongated hole 81Q to thereby lessen the concentration of surface pressure on the inner circumference 81Qa of the elongated hole 81Q, thereby allowing the elongated hole inserted portion (the large diameter portion 53R) to be dislocated smoothly from an initial assembling position.

In particular, the sliding member 120 includes the pair of flat surface portions 123, 124 which extend parallel to the column moving direction X1 while facing the pair of flat surface portions 83Q, 84Q of the elongated hole 81Q, respectively. Therefore, the concentration of surface pressure is lessened in an ensured fashion, thereby making it possible to realize a smooth dislocation in an ensured fashion.

In the fourth embodiment, although the sliding member 120 as the surface pressure concentration lessening member is provided only in the one elongated hole 81, the sliding member 120 may be provided only in the other elongated hole 82, or the sliding member 120 may be provided in both the elongated holes 81, 82.

The invention is not limited to the embodiments that have been described heretofore. Although not shown, for example, in the first embodiment shown in FIG. 9 and the second embodiment shown in FIG. 10, the pair of tapered surface portions 86, 87 are provided on the one elongated hole 81. However, in place of this configuration, a pair of tapered surface portion (not shown) may be provided on the other elongated hole 82. In addition, the sliding member 120 of the fourth embodiment shown in FIG. 12 may be combined with the one elongated hole 81 having the pair of tapered surface portions 86, 87 shown in FIGS. 9 (the first embodiment) and 10 (the second embodiment) or the other elongated hole 82 having the pair of tapered surface portions (not shown). In addition to those described above, various alterations or modifications can be made to the invention without departing from the scope of claims of the invention.

REFERENCE SIGNS LIST

1: steering device
2: steering member
3: steering shaft
13: vehicle body-side member 15: steering column
16: upper jacket (movable jacket)
23: fixed bracket
24 tilt bracket (movable bracket)
251, 252: suspending bolt (suspending shaft)
26: column bracket
30: first plate
32: second plate
53; 53P; 53Q: large diameter portion (elongated hole inserted portion)
61: resin pin
81; 81Q: elongated hole
81a; 81Qa: inner circumference (of elongated hole)
83; 83Q: flat surface portion
84; 84Q: flat surface portion
85; 85Q: arc-shaped surface portion
85a, 85b; 85Qa, 85Qb: end portion
86, 87: tapered surface portion
91, 92: circular hole
100: steering device
110: rotary member (surface pressure concentration lessening member)
110a: outer circumference
120: sliding member (surface pressure concentration lessening member)
120a: outer circumference
123: flat surface portion
124: flat surface portion
125: arc-shaped surface portion
D1; D1P: outside diameter (of elongated hole inserted portion)
E1; E1Q: radius of curvature (of arc-shaped surface portion)
F1; F1P: radius (of outer circumference of elongated hole inserted portion)
R1: connecting-disconnecting mechanism
T1, T2: suspending mechanism
W1; W1Q: space (between pair of flat surface portions)
θ1, θ2: tapered angle
X1: column moving direction
X2: opposite direction to column moving direction
Y1: direction at right angles to column moving direction

The invention claimed is:

1. A steering device comprising:
a fixed bracket which includes a first plate fixed to a vehicle body-side member;
a movable jacket which rotatably supports a steering shaft having a steering member connected to one end of the steering shaft;
a movable bracket which supports the movable jacket so as to move in a column moving direction when a secondary collision occurs and which includes a second plate facing the first plate; and
a pair of suspending mechanisms which include a pair of suspending shafts inserted through a pair of elongated holes and a pair of circular holes, the elongated holes being provided in the first plate so as to extend parallel to the column moving direction and the circular holes being provided in the second plate so as to respectively correspond to the pair of elongated holes, to connect the first plate and the second plate together to thereby suspend the movable jacket via the movable bracket, wherein respective elongated hole inserted portions of the suspending shafts move from an initial assembling position in the column moving direction along the corresponding elongated holes when the secondary collision occurs,
wherein an inner circumference of either of the elongated holes includes a pair of flat surface portions which extend parallel to the column moving direction and a space defined therebetween which is greater than an outside diameter of the elongated hole inserted portion of the corresponding suspending shaft, a concavely arc-shaped surface portion which bears part of an outer circumference of the elongated hole inserted portion of the corresponding suspending shaft which is disposed in the initial assembling position, and a pair of tapered surface portions which extend individually from a pair of end portions of the arc-shaped surface portion in a tangential direction to connect to the corresponding flat surface portions, and
wherein tapered angles which the tapered surfaces form relative to the column moving direction are equal to or greater than a friction angle.

2. The steering device according to claim 1, further comprising:
a surface pressure concentration lessening member which surrounds the elongated hole inserted portion of the suspending shaft which is inserted through the one of the elongated holes to scatter a contact pressure against the inner circumferential surface of the one elongated hole.

3. The steering device according to claim 2, wherein
the surface pressure concentration lessening member includes a rotary member which is fitted on the elongated hole inserted portion rotatably so as to be brought into rolling contact with the inner circumference of the one elongated hole.

4. The steering device according to claim 2, wherein
the surface pressure concentration lessening member includes a sliding member which is fitted on the elongated hole inserted portion so as to be brought into sliding contact with the inner circumference of the one elongated hole.

5. The steering device according to claim 4, wherein
the sliding member includes an arc-shaped surface portion which fits in the arc-shaped surface portion of the one elongated hole and a pair of flat surface portions which extend parallel to the column moving direction while facing the pair of flat surface portions of the one elongated hole, respectively.

6. A steering device comprising:
a fixed bracket which includes a first plate which is fixed to a vehicle body-side member;
a movable jacket which rotatably supports a steering shaft having a steering member connected to one end of the steering shaft, and a movable bracket which supports the movable jacket so as to move in a column moving direction when a secondary collision occurs and which includes a second plate facing the first plate;
a pair of suspending mechanisms which include a pair of suspending shafts which are inserted through a pair of elongated holes and a pair of circular holes, the elongated holes being provided in the first plate so as to extend parallel to the column moving direction and the circular holes being provided in the second plate so as to respectively correspond to the pair of elongated holes, to connect the first plate and the second plate together to thereby suspend the movable jacket via the movable bracket, wherein respective elongated hole inserted portions of the suspending shafts move from an initial assembling position in the column moving direction along the corresponding elongated holes when the secondary collision occurs; and a surface pressure concentration lessening member which surrounds the elongated hole inserted portion of the suspending shaft which is inserted through at least one of the elongated holes to scatter a contact pressure against an inner circumference of the corresponding elongated hole, the surface pressure concentration lessening member contacting an end of the inner circumference of the elongated hole.

7. The steering device according to claim 6, wherein the surface pressure concentration lessening member includes a rotary member which is fitted on the elongated hole inserted portion rotatably so as to be brought into rolling contact with the inner circumference of the corresponding elongated hole.

8. The steering device according to claim 6, wherein the surface pressure concentration lessening member includes a sliding member which is fitted on the elongated hole inserted portion so as to be brought into sliding contact with the inner circumference of the corresponding elongated hole.

* * * * *